United States Patent Office.

ANTONIO MEUCCI, OF CLIFTON, NEW YORK.

IMPROVED PROCESS FOR MAKING PAPER-PULP FROM WOOD.

Specification forming part of Letters Patent No. 53,165, dated March 13, 1866.

*To all whom it may concern:*

Be it known that I, ANTONIO MEUCCI, of Clifton, in the county of Richmond and State of New York, have invented a new and useful process of treating vegetable materials for the purpose of separating the vegetable fiber from the substances with which it is found combined in nature; and I do hereby declare that the following is a full, clear, and exact description of the said process, which consists in treating the vegetable material with a mixture of dilute nitric and muriatic acids and then subjecting them to the action of an alkali, substantially as hereinafter described.

When wood is the vegetable material to be operated upon my process may be practiced as follows: Pine or spruce wood is preferred, and it should be sawed into short lengths and then split into pieces about the dimensions of match-splints. The wood should also be dry, but this is not essential. The wood thus prepared is steeped in an acid liquor or bath composed of dilute nitric and muriatic acid in the following proportions, viz: commercial nitric acid, five pounds by weight; commercial muriatic acid, five pounds by weight; water, one hundred pounds by weight. The most convenient mode of applying this acid liquor is to place the wood in a suitable vessel, to confine it in place by a perforated diaphragm, and to pour the acid liquor upon it in sufficient quantity to cover it. The wood is permitted to steep in the acid liquor until it becomes brittle and will break easily, which generally requires a period of from three to five days. It is then removed from the acid liquor, drained, and washed in water, so as to cleanse it as much as possible of free acid. The washed wood is drained, and is then boiled for from three to five hours (according to its condition) in a strong solution of caustic soda containing from thirty to forty pounds of soda for each one thousand pounds of wood, the soda being dissolved in a sufficient quantity of water to cover the wood. The boiled wood is then placed in one of the ordinary pulping-engines used by paper-makers, and is washed, pulped, and bleached, if necessary, in the usual manner practiced with rags, until it is in a suitable condition for the manufacture to which it is to be applied. Afterward it may be drained and dried if it is to be sent to market in a crude state.

When straw is the vegetable material made use of it is expedient to boil it for two or three hours in a solution of soda-ash in the proportion of two or three pounds of soda-ash for each one hundred pounds of straw, the effect of this preparation being to open the joints. It is then drained and washed to remove the free alkali as much as possible. The washed straw is steeped in a sufficient quantity of the acid liquor to cover it, the said liquor consisting of commercial nitric acid, one and one-half pound by weight; commercial muriatic acid, one and one-half pound by weight; water, one hundred pounds by weight. When it has remained in this bath from twenty-four to thirty-six hours it is sufficiently prepared for the action of the alkali, and it is then taken from the acid-bath and treated in the same manner as I have above described for wood, the alkali being of the same strength and the treatment being the same as for wood.

Although the above-mentioned proportionate quantities of dilute acids and alkali have been found by me to produce satisfactory results, still I do not limit my invention to such precise quantities and proportions, nor to the precise periods above stated for the duration of the treatment, as these may be varied as circumstances may render expedient.

The process is applicable to hay, the leaves of trees, and Indian corn, weeds, old rope, and various other vegetable substances. It may also be practiced by the use of a single vessel; but it is preferable to have a special vessel for each operation, and it is economical to subject each lot of material to the action of the spent acid liquor of a preceding charge before subjecting it to fresh acid liquor, as by this means acid is economized.

In some cases it may be expedient to cut the vegetable material into very short fragments, and even to crush it between rolls, before subjecting it to the acid liquor, and I propose to do so as occasion may require.

What I claim as my invention, and desire to secure by Letters Patent, is—

The process of treating vegetable material with dilute nitric and muriatic acids, and then subjecting it to the action of an alkali, substantially as set forth.

In witness whereof I have hereunto set my hand this 27th day of July, A. D. 1865.

ANTONIO MEUCCI.

Witnesses:
JOHN S. CLARK,
FRANCIS J. RAYÉ.